UNITED STATES PATENT OFFICE.

CHARLES R. GOODWIN, OF PARIS, FRANCE.

COMPOSITION FOR POROUS CARBON STRUCTURES.

SPECIFICATION forming part of Letters Patent No. 431,743, dated July 8, 1890.

Original application filed May 28, 1886, Serial No. 203,503. Divided and this application filed January 18, 1890. Serial No. 337,352. (No specimens.) Patented in France September 9, 1885, No. 171,105; in Belgium February 20, 1886, No. 72,073, and in England February 25, 1886, No. 2,773.

*To all whom it may concern:*

Be it known that I, CHARLES RHODES GOODWIN, a citizen of the United States, residing at the city of Paris, France, have invented certain new and useful Improvements in Compositions for Porous Carbon Structures, (for which I have obtained Letters Patent in France September 9, 1885, No. 171,105; in Belgium February 20, 1886, No. 72,073, and in Great Britain February 25, 1886, No. 2,773,) of which the following is a full, clear, and exact description.

This invention relates to improvements in the method of forming porous carbon structures and to the structures as the result of such method, and particularly to compositions for forming a porous carbon structure for use in voltaic batteries for separating the exciting-liquid from the depolarizing agent.

The object is to provide a carbon structure having a high degree of porosity. To accomplish this, I mix with finely-divided hard carbon—gas carbon, for example—the residium from the distillation of gas and analogous products from coal, or its equivalents for this special purpose, such as prepared charcoal, lignite, and the like, sawdust, chopped straw, or similarly-constituted organic material of a particulate or fibrous and carbonaceous nature, capable of acting as spacing substances, and of leaving pores or spaces in the mass when baked, in the proportions of from ten to forty per cent. of the sawdust or said similar material. The mixing or agglomerating should be very carefully and thoroughly accomplished, and the mass rendered plastic by any suitable agglomerant—such, for example, as molasses or sugar candy or dextrine. I have used a mixture of sawdust, rice-powder, and dextrine together with good results. The mixture is then molded under sufficient pressure to form and retain the structure in the desired shape, and then subjected to a firing process, in which the heat must not be so high nor the pressure be so great as to destroy the fibrous or particulate structure of the sawdust or said similar spacing material, as this would destroy the spaces or artificial pores which give to the carbon the degree of porosity sought. I find from 800° to 1,500° centigrade a proper temperature. The result is a carbon structure of a very high degree of porosity, the sawdust or other organic or suitable material having served to separate the particles of hard carbon throughout the structure.

The method of forming the porous carbon structure above set forth and claimed in my pending application, Serial No. 203,503, filed May 28, 1886, of which this present application is a division, and said method is disclaimed herein in favor of said application.

What I claim is—

1. The composition of finely-divided gas or other hard carbon with agglomerants forming moldable paste and with organic matter of such cellular or fibrous structure as is capable when baked in the mass of porous carbonization without sensible diminution in volume, substantially as set forth.

2. The composition of finely-divided gas or other hard carbon by proper agglomerants with particulate organic matter, baked sufficiently to convert said organic matter into charcoal, substantially as set forth.

3. The composition consisting of hard carbon, fibrous carbon, and a carbonized agglomerant, the fibrous carbon forming a highly-porous structure throughout the composition, substantially as set forth.

CHAS. R. GOODWIN.

Witnesses:
 CH. D'ESTAINVILLE,
 A. SAMEN, F.